(12) United States Patent  (10) Patent No.: US 8,617,012 B2
Young et al.  (45) Date of Patent: Dec. 31, 2013

(54) BLADE TENSIONER WITH CAPTURED SPRING

(75) Inventors: James D. Young, Chesaning, MI (US); Darren J. Stewart, Howell, MI (US)

(73) Assignee: Cloyes Gear and Products, Inc., Fort Smith, AR (US)

( * ) Notice: Subject to any disclaimer, the term of this patent is extended or adjusted under 35 U.S.C. 154(b) by 642 days.

(21) Appl. No.: 12/621,001

(22) Filed: Nov. 18, 2009

(65) Prior Publication Data

US 2010/0210384 A1   Aug. 19, 2010

Related U.S. Application Data

(60) Provisional application No. 61/115,726, filed on Nov. 18, 2008.

(51) Int. Cl.
*F16H 7/08* (2006.01)

(52) U.S. Cl.
USPC .......................................... 474/111; 474/140

(58) Field of Classification Search
USPC ........................................ 474/109–111, 140
See application file for complete search history.

(56) References Cited

U.S. PATENT DOCUMENTS

| | | |
|---|---|---|
| 5,286,234 A | 2/1994 | Young |
| 5,425,680 A | 6/1995 | Young |
| 5,711,732 A | 1/1998 | Ferenc et al. |
| 5,782,625 A | 7/1998 | Young |
| 5,797,818 A | 8/1998 | Young |
| 6,354,972 B1 | 3/2002 | Young |
| 6,572,502 B1 | 6/2003 | Young et al. |
| 6,623,391 B2 | 9/2003 | Young et al. |
| 6,835,149 B2 * | 12/2004 | Konno et al. ................ 474/111 |
| 7,074,146 B2 * | 7/2006 | Fujikubo et al. ............. 474/111 |
| 2002/0045503 A1 | 4/2002 | Young et al. |

(Continued)

FOREIGN PATENT DOCUMENTS

WO    WO 97/33104    9/1997

OTHER PUBLICATIONS

International Preliminary Report on Patentability mailed Jun. 3, 2011 for International application No. PCT/US2009/064953.

(Continued)

*Primary Examiner* — Sang Kim
(74) *Attorney, Agent, or Firm* — Fay Sharpe LLP

(57) ABSTRACT

A chain tensioner assembly includes a bracket with a main wall and a ramp surface. A blade assembly is connected to the bracket and includes a blade located adjacent the main wall of the bracket. The blade includes: (i) a first blade end with a pivot aperture; (ii) a second blade end contacting the ramp surface; and, (iii) a central blade portion that extends between the first and second blade ends. The central blade portion includes a chain engaging surface. A first spring-retaining slot is located in the first blade end and includes inner and outer open sides that open respectively through inner and outer faces of the blade. A second spring-retaining slot is located in the second blade end. A spring includes a first end located in the first spring-retaining slot, a second end located in the second spring-retaining slot; and, a central portion that abuts the central blade portion. A pivot fastener extends through the pivot aperture and obstructs the outer open side of the first spring-retaining slot such that the pivot fastener captures the first end of the spring in the first spring-retaining slot.

16 Claims, 5 Drawing Sheets

(56) References Cited

U.S. PATENT DOCUMENTS

| | | |
|---|---|---|
| 2003/0144101 A1 | 7/2003 | Konno et al. |
| 2004/0132569 A1* | 7/2004 | Fujikubo et al. ............... 474/111 |
| 2009/0036241 A1* | 2/2009 | Hirayama et al. ............ 474/111 |
| 2012/0035010 A1* | 2/2012 | Young ........................... 474/111 |

OTHER PUBLICATIONS

International Search Report for International application No. PCT/US2009/064953 mailed Feb. 16, 2010.

Written Opinion of the International Searching Authority for International application No. PCT/US2009/064953 mailed Feb. 16, 2010.

* cited by examiner

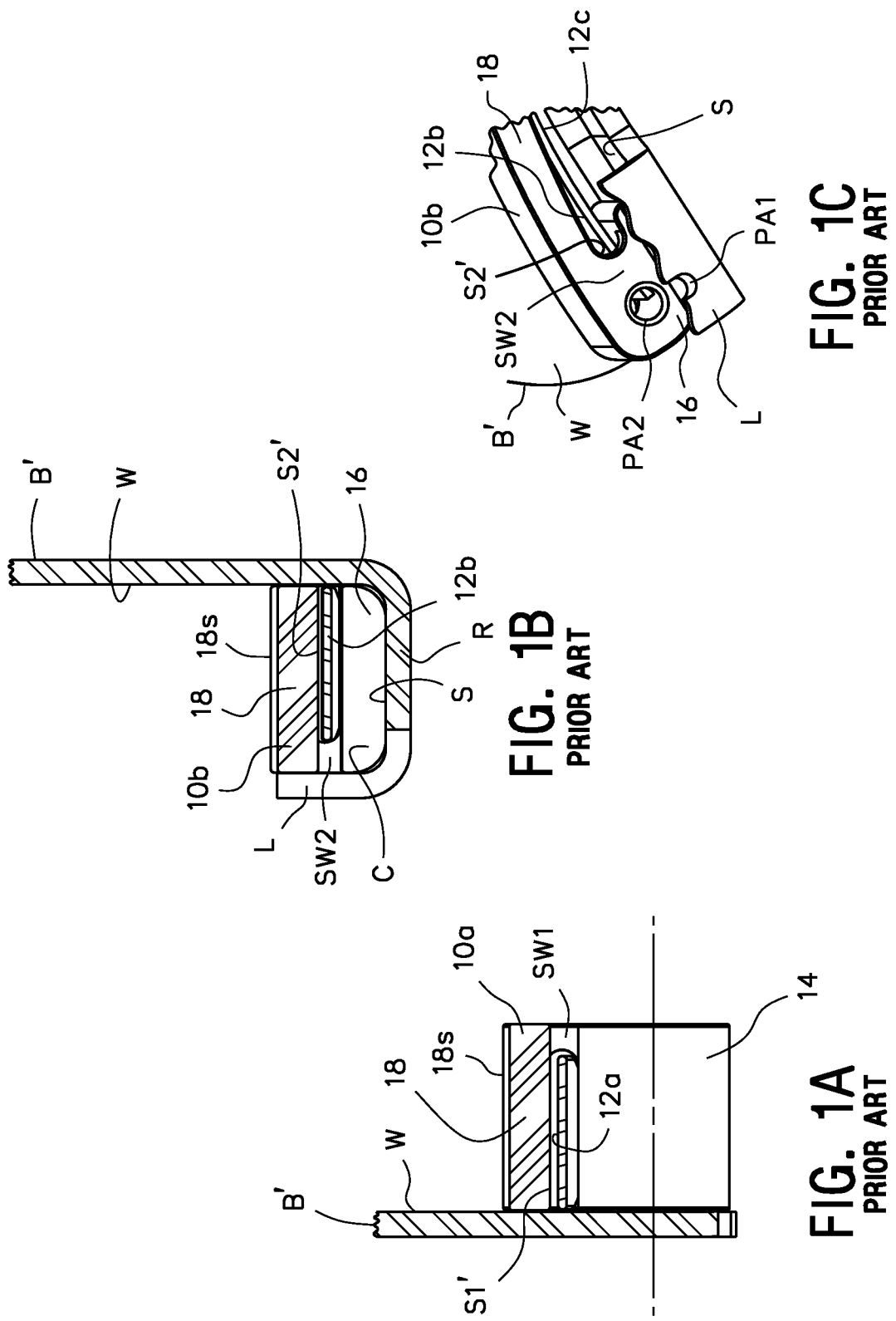

BLADE TENSIONER WITH CAPTURED SPRING

CROSS-REFERENCE TO RELATED APPLICATION

This application claims priority from and benefit of the filing date of U.S. provisional patent application Ser. No. 61/115,726 filed Nov. 18, 2008, and the entire disclosure of said provisional application is hereby expressly incorporated by reference into the present specification.

BACKGROUND

FIG. 1 is an isometric view of a known blade tensioner assembly TA' for tensioning the slack strand of an automotive camshaft timing and/or balance shaft chain drive system. FIGS. 1A and 1B are respective sectional views taken at lines 1A-1A and 1B-1B of FIG. 1, and FIG. 1C illustrates a portion of FIG. 1 partially broken away to reveal the underlying structures. A bracket B', typically defined as a one-piece metal stamping, is fixedly secured to an engine block, head, or other engine structure using one or more bolts or other fasteners F. The bracket B' includes a main wall W, that is usually vertically oriented, and reaction ramp R that projects transversely outward from the main wall W. The ramp R comprises a reaction surface S which is typically planar but could be curved (e.g., convex or concave). The bracket B' also includes a ramp support flange RF that projects from wall W and that is connected to and extends from the ramp R. The support flange RF is often defined with curved shape as shown for added strength required for preventing deflection of the ramp R and/or main wall W. The bracket B' further includes a lip L that extends upwardly from the ramp R so as to be parallel and spaced-apart from the main wall W. A channel C is defined by the main wall W, the reaction surface S, and the lip L.

In the illustrated embodiment, a cylindrical pivot pin P is connected to and projects outwardly from the main wall W at a location spaced from the ramp. The blade tensioner assembly TA' further comprises a blade assembly BA' including a first or pivot end BA1 pivotally mounted on the pin P and a second or free end BA2 located in the channel C. The blade assembly BA' comprises a one-piece molded polymeric or "plastid" blade 10 and a one-piece metal leaf spring 12 secured to the blade 10. The blade 10, itself, comprises a first or pivot end 10a and a second or free end 10b. The first end 10a of the blade comprises a pivot boss 14 including a cylindrical aperture 14a defined therein and adapted to be closely received on the cylindrical pivot pin P with minimal clearance. In some known prior blade tensioner assemblies, a shoulder bolt is used in place of the pin P for pivotally mounting the blade assembly to the bracket (and also securing the bracket B' to the engine). The second end 10b of the blade comprises a foot 16 that is adapted to be located in the channel C of bracket B'. The first and second ends 10a,10b of the blade 10 are connected by a spine or central portion 18 that comprises a chain engaging slide surface 18s that is convexly curved. The central portion 18 is dimensioned and conformed so that it is able to flex resiliently in response to forces Z1 exerted thereon by an associated chain sliding on surface 18s, with the chain moving from the upstream first end 10a of the blade 10 toward the downstream second end 10b of the blade. A first end of the central portion 18 is connected to the pivot boss 14 by a first connecting wall 15, and a second end of the central portion 18 is connected to the foot 16 by a second connecting wall 17.

Referring also more particularly to FIGS. 1A, 1B and 1C, it can be seen that the first end 10a of the blade comprises a first slot S1' and the second end 10b comprises a second slot S2'. Opposite first and second ends 12a,12b of the spring 12 are respectively positioned in the first and second slots S1', S2', and a convexly curved central portion 12c of the spring 12 abuts the central portion 18 of the blade 10, on the opposite side from chain engaging surface 18s. The spring 12 exerts a biasing force Z2 (FIG. 1) on the central portion 18 of blade for counteracting the chain forces Z1 in order to tension the slack strand of the chain. Flexing movement of the blade central portion 18 in response to chain forces Z1 and the counteracting spring biasing force Z2 (i.e., in the directions Z1 and Z2) results in forward and backward oscillatory sliding movement of the foot 16 on the ramp surface S in the channel C and corresponding oscillatory angular movement of the pivot boss 14 about pivot pin P.

The ends 12a,12b of the spring 12 are captured in the slots S1',S2' on an inner side by the wall W and on the opposite outer side by walls SW1,SW2 of the blade 10, respectively. The bracket lip L and wall SW2 include respective apertures PA1,PA2 (FIG. 1C) adapted for insertion of a pin (not shown) for fixedly securing the foot 16 of the blade 10 in the bracket channel C during shipping, handling and installation of the tensioner assembly TA', and the pin must be removed from the apertures PA1,PA2 prior to use of the tensioner assembly TA'.

As is apparent in FIGS. 1A and 1B, the requirement to include the spring capturing walls SW1,SW2 leads to the slots S1',S2' being asymmetric in the sense that the walls SW1,SW2 are located on the outer side of the slots S1',S2', but not on the inner side of the slots S1',S2'. The slots S1',S2' must remain open on the inner side opposite the walls SW1, SW2 in order to insert the spring 12 and also to allow for injection molding the blade 10 with walls slots SW1,SW2. These walls SW1,SW2 have been found to lead to regions of undesired stress concentration in the blade 10, particularly at the pivot end 10a in the wall connecting the pivot boss 14 to the central portion 18.

SUMMARY

A chain tensioner includes a blade assembly with a blade and a spring connected to said blade. The spring includes opposite first and second ends located respectively in first and second spring-retaining slots of the blade. A pivot fastener extends through a pivot aperture located in a first end of said blade, and the pivot fastener obstructs an open outer side of the first spring-retaining slot to capture the first end of the spring in the first spring-retaining slot.

A chain tensioner assembly includes a bracket with a main wall and a ramp surface. A blade assembly is connected to the bracket and includes a blade located adjacent the main wall of the bracket. The blade includes: (i) a first blade end with a pivot aperture; (ii) a second blade end contacting the ramp surface; and, (iii) a central blade portion that extends between the first and second blade ends. The central blade portion includes a chain engaging surface. A first spring-retaining slot is located in the first blade end and includes inner and outer open sides that open respectively through inner and outer faces of the blade. A second spring-retaining slot is located in the second blade end. A spring includes a first end located in the first spring-retaining slot, a second end located in the second spring-retaining slot; and, a central portion that abuts the central blade portion. A pivot fastener extends through the pivot aperture and obstructs the outer open side of the first spring-retaining slot such that the pivot fastener captures the first end of the spring in the first spring-retaining slot.

BRIEF DESCRIPTION OF THE DRAWINGS

FIGS. 1A and 1B are respective sectional views taken at lines 1A-1A and 1B-1B of FIG. 1;

FIG. 1C illustrates a portion of FIG. 1 partially broken away to reveal the underlying structures;

DETAILED DESCRIPTION OF INVENTION

Figure 2:
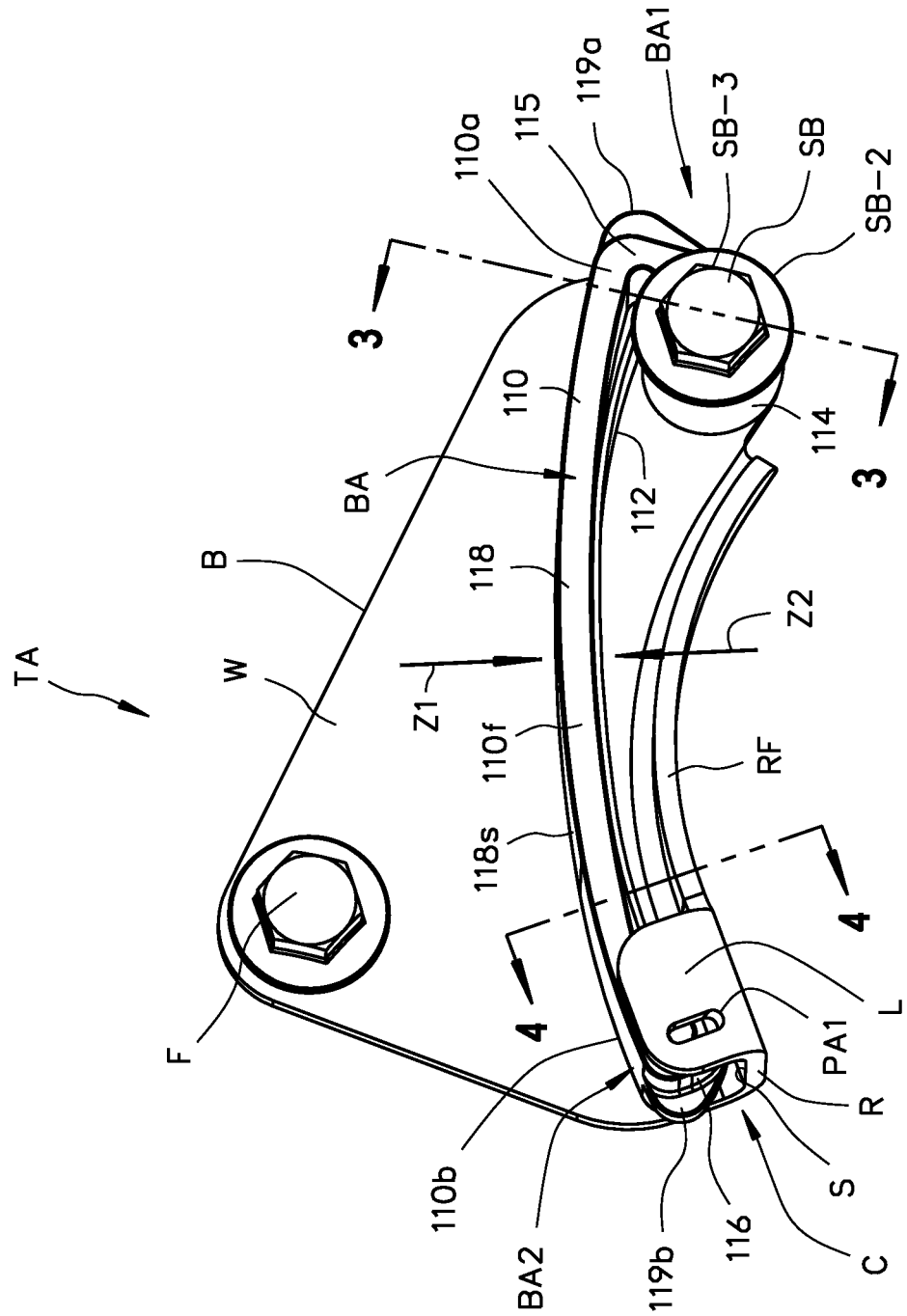
FIG. 2 is an isometric view of a tensioner assembly formed in accordance with the present development.
Figure 4:
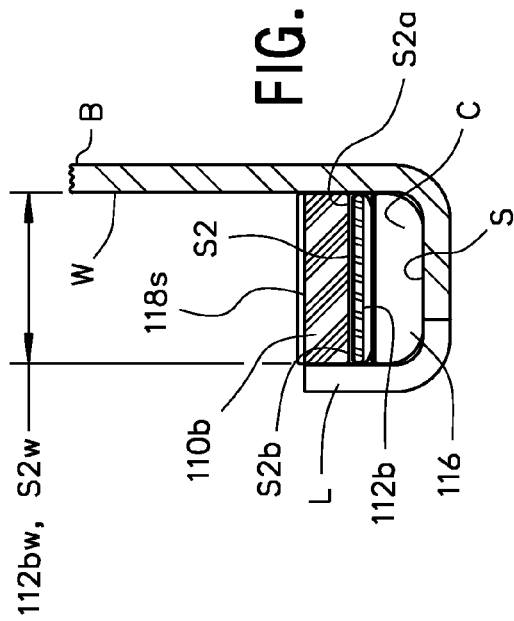
FIGS. 3 and 4 are sectional views as taken along lines 3-3 and 4-4 of FIG. 2, respectively.
Figure 5:
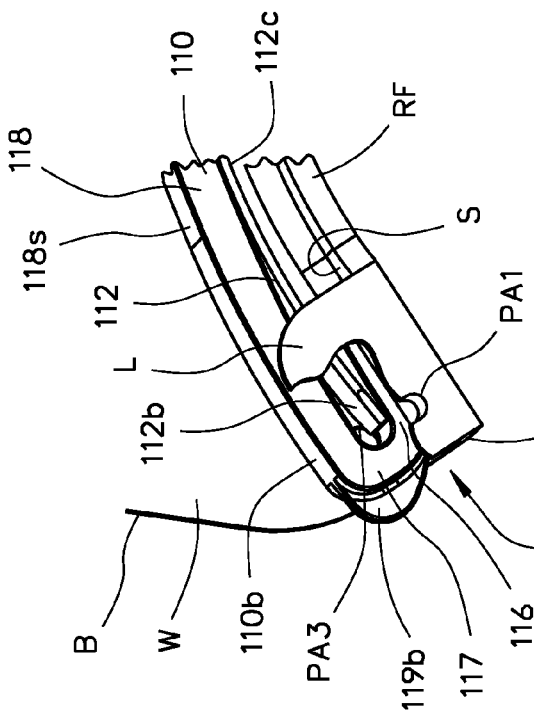
FIG. 5 is a partial view of the tensioner assembly shown in FIG. 2, with a portion removed to reveal underlying structures.
Figure 3:
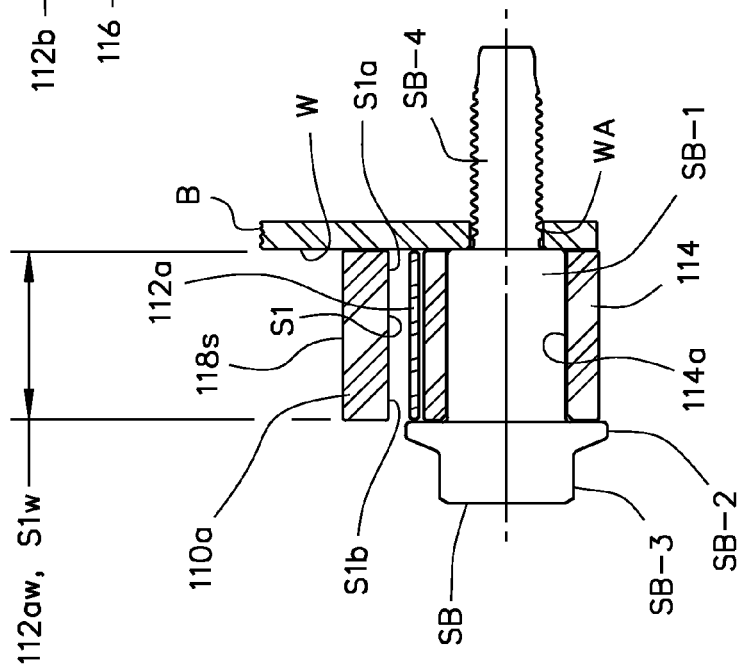

FIG. 2 is an isometric view of a tensioner assembly TA formed in accordance with the present development. Except as otherwise shown and/or described herein, the tensioner assembly TA is identical to the tensioner assembly TA'. As such, like reference numbers are used to identify like components. FIGS. 3 and 4 are sectional views as taken along lines 3-3 and 4-4 of FIG. 2, respectively. FIG. 5 is a partial view of the tensioner assembly TA as shown in FIG. 2, with a portion removed to reveal underlying structures.

The tensioner assembly TA uses a bracket B in place of the bracket B'. The pivot pin P of the bracket B' is replaced by a pivot fastener such as a shoulder bolt fastener SB that is used to secure the bracket B to an engine with at least one other fastener F. The bracket B includes a planar main wall W, ramp R, ramp support flange RF, lip L and channel C as described above for bracket B'. A blade assembly BA is secured to the bracket B by the shoulder bolt SB, with the first or pivot end BA1 pivotally mounted on the shoulder bolt SB and the second or free end BA2 located in the channel C. The blade assembly BA is similar to the blade assembly BA' in that it comprises a one-piece molded polymeric or "plastic" blade 110 located adjacent the main wall of the bracket, and a one-piece metal leaf spring 112 secured to the blade 110 (see also FIG. 6). The blade 110 is generally similar to the blade 10 described above and, thus, comprises a first or upstream end 110a and a second or downstream end 110b. The first end 110a of the blade comprises a pivot boss 114 including a pivot aperture 114a, and the second end 110b of the blade comprises a foot 116 that is adapted to be located in the channel C of bracket B. The first and second ends 110a,110b of the blade 110 are connected by a spine or central portion 118 that comprises a chain engaging slide surface 118s that is convexly curved. The central portion 118 is dimensioned and conformed so that it is able to flex resiliently in response to forces Z1 exerted thereon by an associated chain sliding on surface 118s. A first connecting wall 115 connects the first or upstream end of the central portion 118 to the pivot boss 114. A second connecting wall 117 connects the second or downstream end of the central portion 118 to the foot 116.

Referring also more particularly to FIGS. 3 and 4, the first end 110a of the blade is pivotally secured adjacent to wall W of bracket B by the shoulder bolt fastener SB, with the aperture 114a defined in the pivot boss 114 of the blade closely and rotatably received on the cylindrical portion SB-1 of the shoulder bolt. The first end 110a of the blade 110 comprises a first spring-retaining slot S1 and the second end 110b comprises a second spring-retaining slot S2. The first slot S1 is located between the pivot boss 114 and the upstream end of the blade central portion 118. The second slot S2 is located between the foot 116 and the downstream end of the blade central portion 118. The spring 112 is a one-piece metal (e.g., spring-steel) leaf spring that includes opposite first and second ends 112a,112b and a convex central portion 112c located between the ends 112a,112b that abuts the central portion 118 of the blade 110, on the opposite side from chain engaging surface 118s. Opposite first and second ends 112a, 112b of the spring 112 are respectively positioned in the first and second slots S1,S2 of the blade 110. The spring 112 exerts a biasing force Z2 on the central portion 118 of blade for counteracting the chain forces Z1 in order to tension the slack strand of the chain. Flexing movement of the blade central portion 118 in response to chain forces Z1 and the counteracting spring biasing force Z2 (i.e., in the directions Z1 and Z2) results in forward and backward oscillatory sliding movement of the foot 116 on the ramp surface S in the channel C and corresponding oscillatory angular movement of the pivot boss 114 about the cylindrical portion SB-1 of the shoulder bolt SB.

Figure 6:
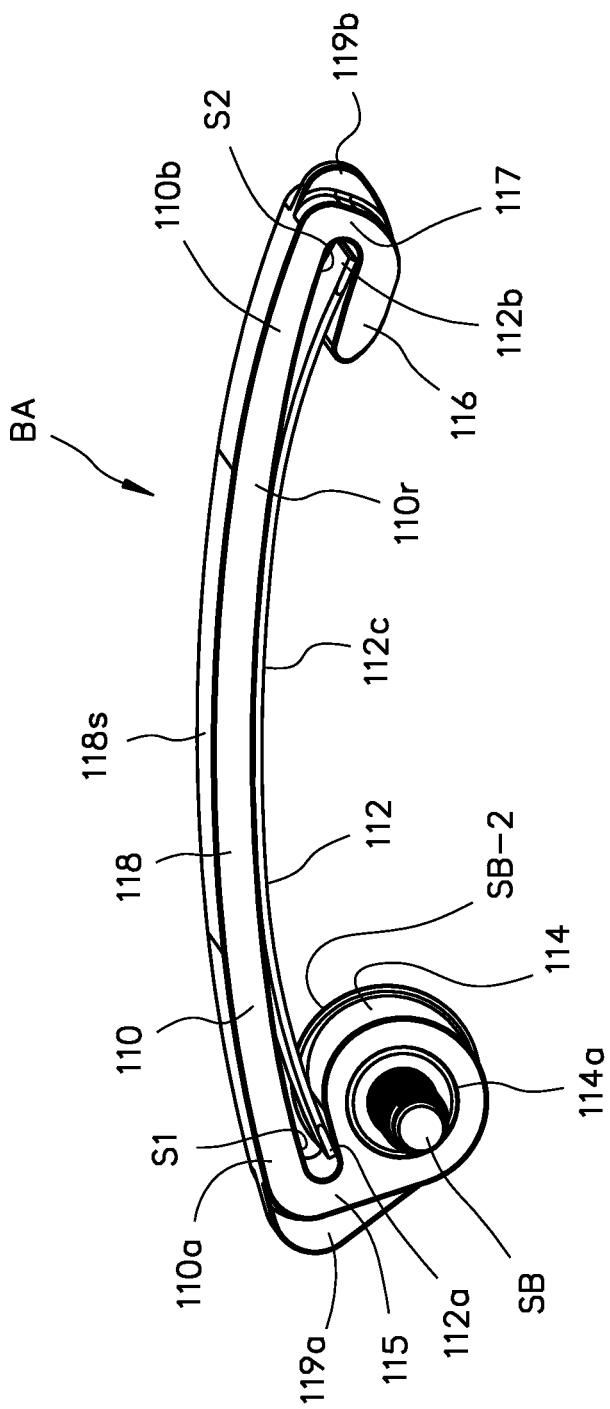
FIG. 6 is an isometric view of the rear side of the blade assembly portion and the shoulder bolt of the tensioner assembly of FIG. 2 (the bracket of the tensioner assembly is not shown).

Unlike the slots S1',S2' of the blade 10 described above, the slots S1,S2 of the blade 110 are open on both their respective inner sides S1a,S2a (adjacent wall W) through a rear or inner face 110r (FIG. 6) of the blade 110 and their respective outer sides S1b,S2b (spaced from wall W) through a front or outer face 110f of the blade 110 so as to be symmetrical, i.e., the walls SW1,SW2 of the blade 10 have been eliminated in the blade 110. Instead, the spring ends 112a,112b are captured in the slots S1,S2 on the inner side by the bracket wall W and on the opposite outer side by the shoulder bolt SB (for slot S1) and bracket lip L (for slot S2), respectively. FIG. 6 shows the inner side of the blade assembly BA by itself. Referring to both FIGS. 3 and 6, it can be seen that the shoulder bolt SB comprises a flange SB-2 located axially between its cylindrical portion SB-1 and its driving head SB-3 that projects radially outward relative to the cylindrical portion SB-1. The location of the pivot boss 114 and pivot aperture 114a, the length of connecting wall 115, the position of the slot S1, and the size of the shoulder bolt flange SB-2 are selected such that the bolt flange SB-2 lies adjacent the outer face 110f of the blade 110 and at least partially obstructs (i.e., at least partially blocks) the open outer side S1b of the slot 51 to capture the first end 112a of the spring 112 in the slot S1. The threaded portion SB-4 of the shoulder bolt SB projects through an aperture WA defined in the main wall W of the bracket B.

As can be seen in FIG. 3, the width 112aw of the spring end 112a is preferably at least substantially coextensive with the width S1w of the slot S1 so that the spring end 112a extends from the outer blade face 110f to the inner blade face 110r and is located between the bolt flange SB-2 and bracket wall W with minimal clearance to prevent undesired movement of the spring end 112a relative to the blade 110 in the slot S1, i.e., movement of the spring end 112a perpendicular to the direction of chain travel on blade surface 118s toward and away from the main wall W of the bracket B.

Figure 1:
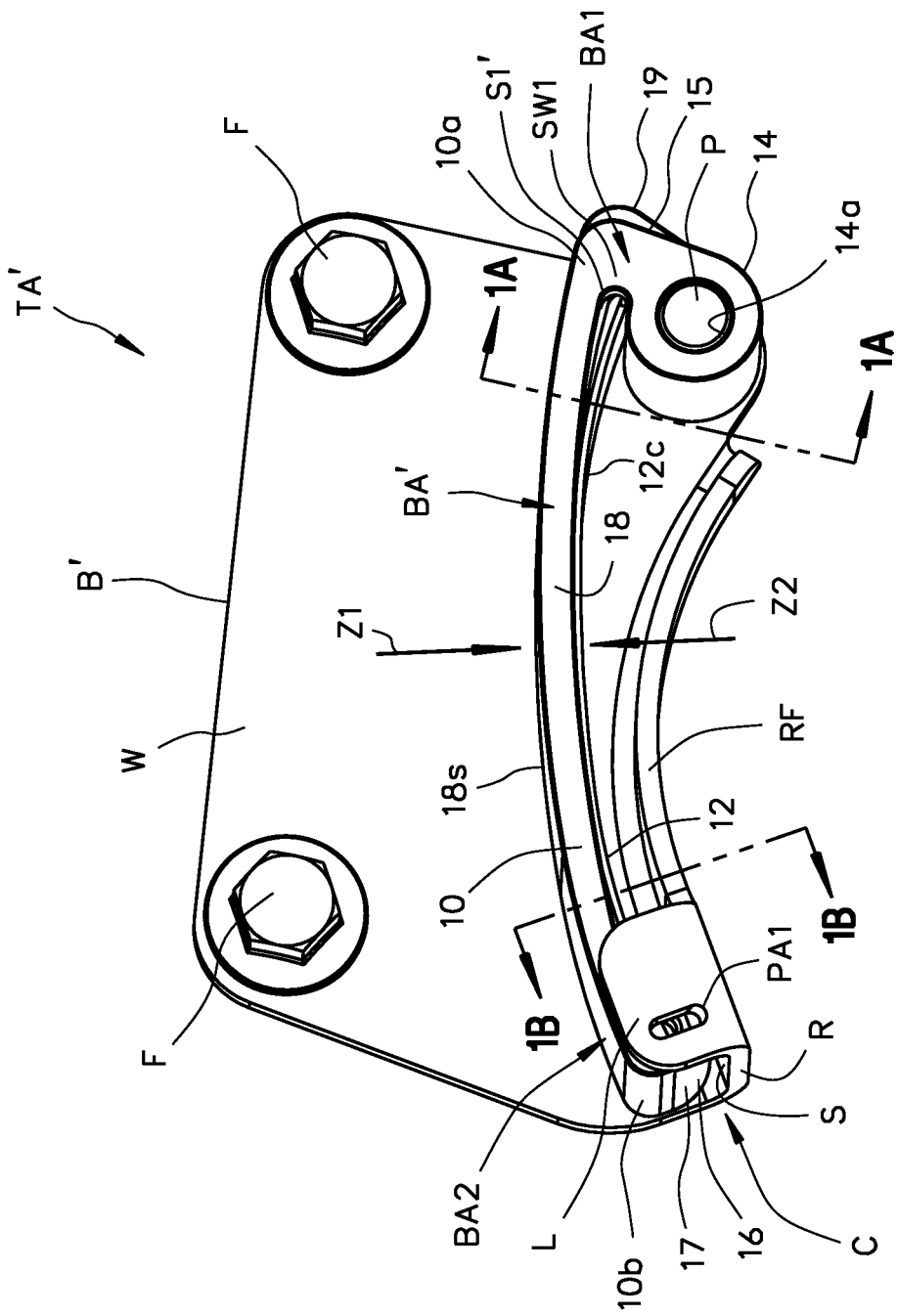
FIG. 1 is an isometric view of a known blade tensioner assembly for tensioning the slack strand of an automotive camshaft timing and/or balance shaft chain drive system.

Referring again briefly to the known tensioner assembly TA' of FIG. 1, it should be noted that even where a conventional shoulder bolt (e.g., bolt SB) has been used in place of the pin P to operatively secure the blade assembly BA' adjacent the bracket B', such shoulder bolt has not been used to capture the spring 12 in the slot S1'. In the known tensioner assembly TA', the wall SW1 or another structure molded into the blade 10, itself, has been required to capture the spring 12 in the slot S1'.

With respect to the slot S2 defined in the foot 116 of the blade 110, the bracket lip L lies adjacent the outer face 110f of the blade 110 and obstructs, i.e., at least partially blocks, the outer side of the slot S2 to capture the second end 112b of the spring in the slot S2 between the lip L and wall W as is readily apparent in FIGS. 4 and 5. With specific reference to FIG. 4, the free end 110b of the blade 110 is closely received in the channel C to minimize its axial movement in the channel C between the wall W and lip L, while still allowing the foot 116 slide reciprocally on the ramp surface S in the chain movement direction and the opposite direction. The width 112bw of the spring end 112b is also preferably at least substantially coextensive with the width S2w of the slot S2 such that the spring extends from the outer blade face 110f to the inner blade face 110r to prevent undesired movement of the spring 112 in the slot S2 relative to the blade 110 in directions transverse to the chain travel direction toward and away from the main wall W of the bracket B.

The elimination of the outer side walls SW1,SW2 of the blade 10 of FIG. 1 allows the first and second spring end widths 112aw,112bw to be maximized for added strength and biasing force as compared to the spring 12 of FIG. 1 and allows the spring 112 to have a uniform width between its first and second ends which simplifies its manufacture and assembly of the blade assembly BA.

The bracket lip L includes an aperture PA1 adapted for insertion of a pin (not shown) therethrough and also into the slot S2 for fixedly securing the foot 116 of the blade 110 in the bracket channel C during shipping, handling and installation of the tensioner assembly TA. As shown herein, the bracket wall W includes an aperture PA3 (FIG. 5) aligned with aperture PA1 into which the pin is also inserted. Such pin must be removed from the apertures PA1,PA3 and slot S2 prior to use of the tensioner assembly TA.

For adding strength to the blade 110, it is known to include a first external rib 119a projecting outwardly from the first connecting wall 115 located between the central portion 118 to the pivot boss 114 (see external rib 19 of FIG. 1). The wall 115 is located between the external rib 119a and the slot S1. This first external rib strengthens and stiffens the first connecting wall 115. Unlike known tensioner blades 10, however, the tensioner blade 110 further includes a second external rib 119b projecting outwardly from the second connecting wall 117 that connects the blade central portion 118 to the foot 116. The wall 117 is located between the external rib 119b and the slot S2. The external rib 119b is preferably located centrally between the inner and outer sides of the slot S2. Over time, the spring 112 will cause the central portion 118 of the blade to become more convex as the chain being tensioned wears and lengthens. This will cause the foot 116 at the free end 110b of the blade 110 to move on the ramp surface S toward the pivot boss 114 of the blade and turn the external rib 119b under toward the ramp surface S. It is preferred that the external rib 119b be dimensioned and shaped such that it remains spaced from (does not contact) the ramp surface S so as to lift the foot 116 away from the surface S at any time over the useful life of the tensioner assembly TA for all operative positions of the blade 110.

It should be noted that the open inner and outer sides S1a,S1b of the first spring-retaining slot S1 begin at the first connecting wall 115 and extend away therefrom (toward the second blade end 110b) in an uninterrupted fashion. There is no wall in or adjacent the slot S1 that obstructs the open inner and outer sides S1a,S1b thereof (such as the prior-art wall SW1 of FIG. 1A) that is located between the first connecting wall 115 and the opposite second end 110b of the blade. Likewise, the open inner and outer sides S2a,S2b of the second spring-retaining slot S2 begin at the second connecting wall 117 and extend away therefrom (toward the first blade end 110a) in an uninterrupted fashion. There is no wall in or adjacent the slot S2 that obstructs the open inner and outer sides S2a,S2b thereof (such as the prior-art wall SW2 of FIG. 10) that is located between the second connecting wall 117 and the opposite first end 110a of the blade. Those of ordinary skill in the art will recognize that the symmetrical nature of the slots S1,S2 as being open on both their inner and outer ends will assist in preventing areas of stress concentration over the useful life of the chain tensioner assembly TA. The pivot end 110a of the blade 110, which is known to be a high-stress area, is particularly improved compared to known designs because the first connecting wall 115 is the only connection between the pivot boss 114 and the central portion 118, and it is permitted to flex resiliently in an evenly distributed manner across the width S1w of the first slot S1.

The shoulder bolt fastener SB can be replaced with any other suitable pivot fastener that can be one-piece (as shown herein) or multi-piece. For example, the cylindrical portion SB-1 and flange portion SB-2 can be provided by a bushing that is pressed into the pivot aperture 114a, and the driving head SB-3 and threaded portion SB-4 can be provided by a conventional bolt that extends through the bushing. The pivot fastener can include a separate washer or other piece that provides the flange or other fastener portion that obstructs the open outer side S1b of the slot S1 to capture the spring 112. The driving head SB-3, itself, can be enlarged sufficiently to define the flange or other fastener portion that obstructs the open outer side S1b of the slot S1 to capture the spring 112.

The invention has been described with reference to preferred embodiments. Modifications and alterations will occur to those of ordinary skill in the art to which the invention pertains, and it is intended that the invention be construed as encompassing all such modifications and alterations.

The invention claimed is:
1. A chain tensioner comprising:
a polymeric blade comprising a first end comprising a pivot boss including a pivot aperture, a second end spaced from first end, and a central portion that extends between said first end and said second end and includes a chain-engaging surface, said first end of said blade including a first spring-retaining slot located between said pivot boss and said central portion, and said second end of said blade including a second spring-retaining slot;
a spring connected to said blade, said spring comprising opposite first and second spring ends located respectively in said first and second spring-retaining slots of said blade, said spring further comprising a central portion that abuts said central portion of said blade;
a shoulder bolt pivot fastener extending through said pivot aperture of said blade, said shoulder bolt pivot fastener comprising: (i) a threaded portion; (ii) a cylindrical portion connected to said threaded portion and located in said pivot aperture of said blade; and (iii) a flange that is radially enlarged relative to said cylindrical portion and located adjacent and in contact with an outer face of said blade, said flange obstructing an open outer side of said first spring-retaining slot that opens through said outer face of said blade to capture said first end of said spring in said first spring-retaining slot.

2. The chain tensioner as set forth in claim 1, further comprising:
a first connecting wall that connects an upstream end of said central blade portion to said pivot boss;
wherein an open inner side of said first spring-retaining slot opens through an inner face of said blade.

3. The chain tensioner as set forth in claim 2, wherein said inner and outer open sides of said first spring-retaining slot each begin at said first connecting wall and extend uninterrupted toward the second blade end.

4. The chain tensioner as set forth in claim 3, further comprising:
a first external rib that projects outwardly from said first connecting wall, wherein said first connecting wall is located between said first spring-retaining slot and said first external rib.

5. The chain tensioner as set forth in claim 3, further comprising:
a foot located at said second end of said blade, wherein said second spring-retaining slot is located between said foot and a downstream end of the blade central portion;
a second connecting wall that connects the downstream end of said central blade portion to said foot.

6. The chain tensioner assembly as set forth in claim 5, wherein said second spring retaining slot comprises inner and outer open sides that open respectively through said inner and outer faces of said blade.

7. The chain tensioner as set forth in claim 6, wherein said inner and outer open sides of said second spring-retaining slot each begin at said second connecting wall and extend uninterrupted toward the first blade end.

8. The chain tensioner as set forth in claim 7, further comprising:
a second external rib that projects outwardly from said second connecting wall, wherein said second connecting wall is located between said second spring-retaining slot and said second external rib.

9. The chain tensioner as set forth in claim 6, further comprising:
a bracket comprising a main wall, a ramp surface, and a lip extending upward from said ramp surface, wherein said foot of said blade contacts said ramp surface between said main wall and said lip such that said open inner and outer sides of said second spring retaining slot are respectively obstructed by said main wall and said lip.

10. The chain tensioner as set forth in claim 1, wherein said first end of said spring defines a width that is coextensive with a width of the first spring-retaining slot and extends from an inner face of said blade to an outer face of said blade.

11. The chain tensioner as set forth in claim 10, wherein said second end of said spring defines a width that is coextensive with a width of the second spring-retaining slot and extends from said inner face of said blade to said outer face of said blade.

12. The chain tensioner as set forth in claim 1, wherein said second end of said spring defines a width that is coextensive with a width of the second spring-retaining slot and extends from an inner face of said blade to said outer face of said blade.

13. The chain tensioner as set forth in claim 1, further comprising:
a bracket comprising a main wall and a ramp surface, wherein a second end of said blade contacts said ramp surface, and wherein said threaded portion of said pivot fastener extends through said main wall.

14. A chain tensioner comprising:
a bracket comprising a main wall;
a blade assembly including a blade and a spring connected to said blade, said spring comprising opposite first and second ends located respectively in first and second spring-retaining slots of said blade, said first spring-retaining slot comprising inner and outer open sides, the outer open side opening through an outer face of said blade and the inner open side opening through an inner face of said blade, the inner face closer to the bracket, the outer face opposite the inner face; and
a pivot fastener extending through a pivot aperture located in a first end of said blade, said pivot fastener comprising a shoulder bolt that includes:
a threaded portion that extends through said main wall;
a cylindrical portion connected to said threaded portion and located in said pivot aperture of said blade; and,
a flange that is radially enlarged relative to said cylindrical portion, said flange located adjacent and abutted with said outer face of said blade and obstructing the open outer side of the first spring-retaining slot.

15. A chain tensioner assembly comprising:
a bracket comprising a main wall and a ramp surface;
a blade assembly connected to the bracket, said blade assembly comprising:
a blade located adjacent said main wall of said bracket, said blade including: (i) a first blade end comprising a pivot aperture; (ii) a second blade end contacting said ramp surface; and, (iii) a central blade portion that extends between the first and second blade ends, said central blade portion comprising a chain engaging surface;
a first spring-retaining slot located in said first blade end and comprising inner and outer open sides that open respectively through inner and outer faces of said blade;
a second spring-retaining slot located in said second blade end;
a spring comprising: (i) a first end located in said first spring-retaining slot; (ii) a second end located in said second spring-retaining slot; and, (iii) a central portion that abuts said central blade portion;
a pivot fastener extending through said pivot aperture, wherein said pivot fastener comprises a radially enlarged portion that abuts said outer face of said blade and obstructs said outer open side of said first spring-retaining slot such that said pivot fastener captures said first end of said spring in said first spring-retaining slot.

16. The chain tensioner assembly as set forth in claim 15, wherein:
said bracket further comprises a lip that extends from said ramp surface;
said second spring-retaining slot comprises inner and outer open sides that open respectively through said inner and outer faces of said blade, wherein said inner and outer open sides of said second spring-retaining slot are obstructed respectively by said main wall and said lip to capture said second end of said spring in said second spring-retaining slot.

* * * * *